F. A. DE CLARK.
EXTENSION COVER FOR AUTOMOBILES.
APPLICATION FILED MAR. 25, 1915.
1,186,883.
Patented June 13, 1916.
2 SHEETS—SHEET 1.
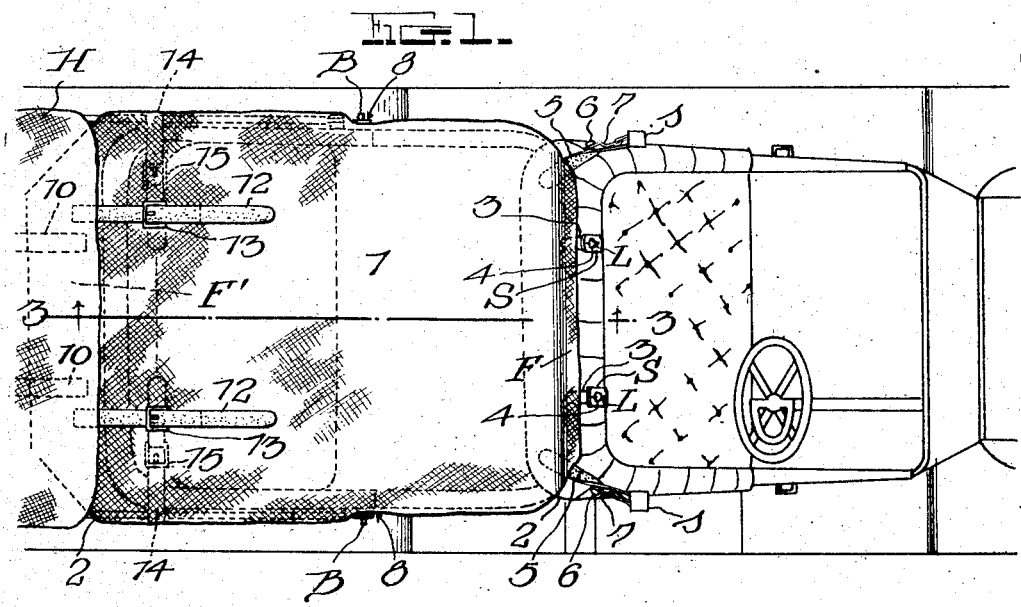
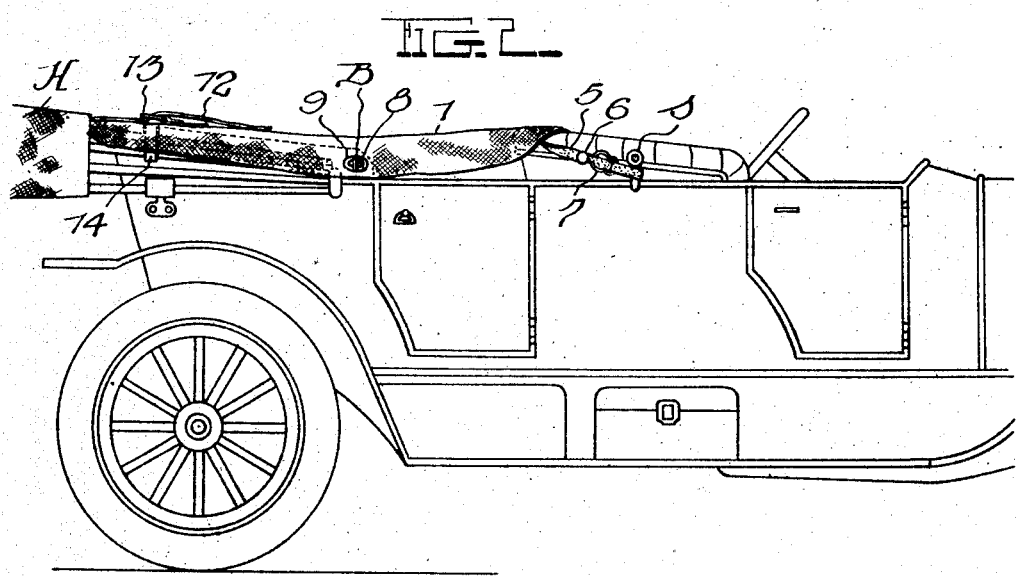
Witnesses
H. Woodard
Inventor
F. A. De Clark
by H. B. Wilson & Co.
Attorneys F. A. DE CLARK.
EXTENSION COVER FOR AUTOMOBILES.
APPLICATION FILED MAR. 25, 1915.
1,186,883. Patented June 13, 1916.
2 SHEETS—SHEET 2.
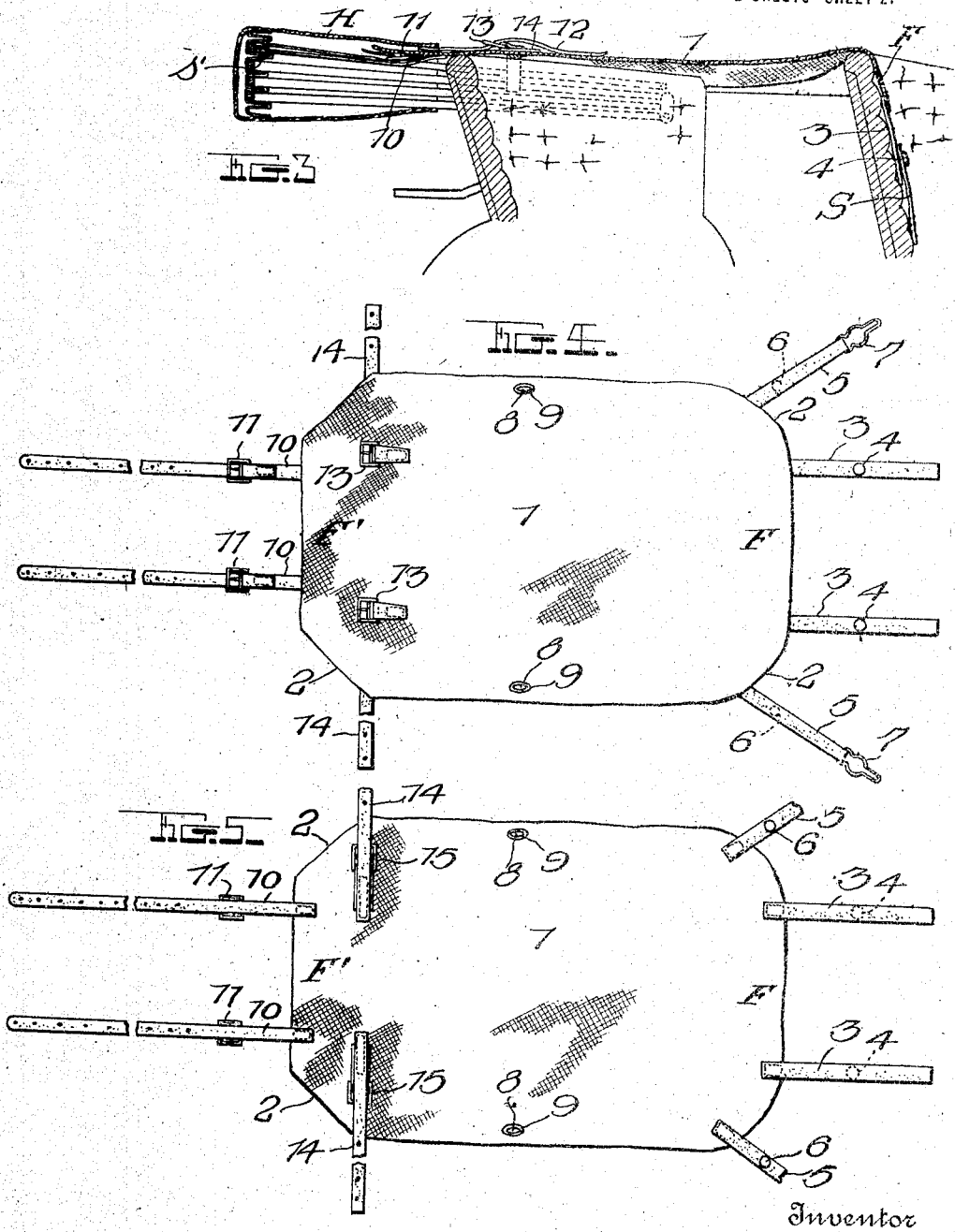
Witnesses
H. Woodard
Inventor
F. A. De Clark
by H. B. Wilson
Attorneys

UNITED STATES PATENT OFFICE.

FRANK A. DE CLARK, OF EMMETT, IDAHO.

EXTENSION-COVER FOR AUTOMOBILES.

1,186,883.  Specification of Letters Patent.  Patented June 13, 1916.

Application filed March 25, 1915. Serial No. 16,975.

*To all whom it may concern:*

Be it known that I, FRANK A. DE CLARK, a citizen of the United States, residing at Emmett, in the county of Canyon and State of Idaho, have invented certain new and useful Improvements in Extension-Covers for Automobiles; and I do declare the following to be a full, clear, and exact description of the invention, such as will enable others skilled in the art to which it appertains to make and use the same.

This invention relates to improvements in covers or extensions designed for covering the rear seats of a vehicle and the space between said seats and the front seat.

The object of the invention is to provide a device of this character so constructed that it will completely cover the rear seat and space between the seats to afford protection against dust, economize in the use of gasolene by preventing the car from catching wind, and provide a protected storage receptacle for parcels, suitcases and the like which is readily accessible to the occupants of the car at all times without necessitating the stoppage of the car.

Another object is to provide a device of this character which may be used either alone or in connection with the usual dust hood for tops.

With these and other objects in view, the invention consists of certain novel features of construction, and the combination and arrangement of parts as will be more fully described and claimed.

In the accompanying drawings: Figure 1 is a top plan view of an automobile equipped with this improved cover and shown in connection with the ordinary hood employed for covering the top when in lowered position; Fig. 2 is a side elevation thereof; Fig. 3 is a longitudinal section thereof taken on the line 3—3 of Fig. 1; Fig. 4 is a top plan view of this improved extension cover detached; Fig. 5 is a bottom plan view thereof.

In the embodiment illustrated the extension cover constituting this invention is shown in the form of a flexible strip 1 composed of any suitable material, preferably of canvas, and which is designed to be of a length greater than the distance between the seat backs of the front and rear seats of the vehicle to which it is to be applied so that the ends thereof may fit over said seat backs and form a protection therefor. This strip 1 is shown with tapered ends, its corners being cut away as indicated at 2 to form front and rear flaps F and F' to closely fit the seat backs to which it is applied without any projecting ends or corners such as would be likely to be caught in the clothes of the occupants of the car.

Straps 3 are secured at one end to the front end of the flap F of the cover 1 in transverse spaced relation, and are here shown provided with buttons 4, although it is obvious that other fastening devices may be employed for connecting these straps to coöperating straps S carried by the back of the front seat of the car, the straps on said front seat having button holes or loops L for detachable engagement with the buttons 4 of the straps 3.

Loops 5 are secured to the opposite front corners of the strip 1 at the inner ends of the flap F and extend obliquely therefrom toward the front, said loops being composed of straps of flexible material having buttons 6 disposed on their lower faces near their inner ends which are adapted to be engaged by button holes or metallic loops 7 carried by the ends of the straps which constitute the loops 5. The loops 5 are designed to be passed around the front top bow socket $s$ at the front of the car whereby in connection with the straps 3, the front of this cover is supported in operative position. Button holes 8 are formed in said strip 1 adjacent the opposite sides thereof intermediately of its ends, said button holes being here shown arranged midway said ends and reinforced by metal plates 9. These button holes are designed to engage the ordinary curtain buttons B carried at the opposite sides of the car and whereby the strip is held taut when applied and transverse sagging thereof prevented. Secured to the free end of the rear flap F' of this strip 1 are two transversely spaced longitudinally extending straps 10 which are provided intermediately of their ends with buckles 11 adapted to be engaged with the free ends of the straps 10 to connect them with the sockets $s'$ on the front of the top of the car when the top is in lowered position, and whereby the rear end of the cover is held in connected operative position when used without the ordinary top cover or hood, it being obvious that when it is used in connection with said hood these straps may be omitted and the rear flap F' of the cover 1 stitched or otherwise connected with said top hood which is here shown at H and is shown detachably connected with said cover 1 by means of straps 12 spaced transversely at the front of said hood and engaged with buckles 13 carried by the upper face of the strip 1 near its rear end.

Straps 14 are shown secured at one end to the under or lower face of the strip 1 at the base or inner end of the flap F' and at points spaced inwardly from the side edges thereof and extend laterally from said cover and are designed to encircle the top bows and connect with buckles 15 carried by said cover 1, said buckles being here shown positioned adjacent the connected ends of said straps 14 and when these straps are connected with said buckles bow encircling loops will be formed which assist in holding the cover in operative position.

From the above description it will be obvious that when a multiseated car is to be used for carrying only one or two persons, that by employing this improved extension cover and connecting it with the front seat and the body and top of the car as above described, the body portion of the car at the rear of the front seat will be completely covered and protected against dust and also against the catching of wind or air during the rapid driving of the car which reduces the resistance offered to the passage of the car, and thereby economizes in the consumption of the gasolene used. In addition to the protection above afforded by said cover, a storage space is formed below the cover in which parcels and other articles may be carried without exposure to dust and the weather and without rendering the car unsightly, giving it the appearance of a runabout or roadster.

When access to the covered portion of the vehicle body is desired by the riders on the front seat, all that is necessary is to unfasten the straps 3 and the loops 5 and turn back the front end of the strip 1, and after the article contained in the vehicle has been removed or another article placed therein, this front portion of the strip may again be secured in operative position by connecting the straps 3 with the seat straps at the front of the car and the loops 5 with the front top bow socket of the car; or when the car is standing, access may be had by opening the side entrance doors.

When it is desired to use the rear seat of the car, this extension cover 1 may be readily disengaged from the top hood H by disconnecting the straps 12 thereof from the buckles 13 on said cover. The cover may then be folded into a very small space and stored away for use again when desired.

If this cover is permanently attached to the top hood when it is desired to use the rear seat, said cover is folded back under the top hood and is thus protected and is out of the way.

I claim as my invention:

A cover for the space between the front and rear seat backs of a vehicle comprising a flexible strip of a length greater than the distance between the front and rear seat backs of the vehicle to which it is to be applied and of a width slightly wider than the vehicle body, said strip having its opposite ends tapered to form front and rear flaps adapted to fit over the front and rear seat backs, transversely spaced straps extending longitudinally from the free ends of said flaps, loops secured to the front corners of said cover at the bases of the front flap thereof, said loops extending obliquely forward therefrom, straps extending laterally from the rear end of said cover at the base of the rear flap thereof, laterally spaced buckles carried by the upper face of said cover near its rear end, and fastening elements disposed at opposite sides of said strip midway the ends thereof for engagement with coöperating elements of the vehicle to which the cover is to be applied for holding said cover against sagging transversely.

In testimony whereof I have hereunto set my hand in presence of two subscribing witnesses.

FRANK A. DE CLARK.

Witnesses:
J. P. REED,
J. G. LEMBKE.